(12) United States Patent
Oliver et al.

(10) Patent No.: US 8,566,341 B2
(45) Date of Patent: Oct. 22, 2013

(54) CONTINUOUS AGGREGATION ON A DATA GRID

(75) Inventors: Brian Oliver, London (GB); Edwin Roberts Misek, Carlisle, MA (US)

(73) Assignee: Oracle International Corporation, Redwood Shores, CA (US)

( * ) Notice: Subject to any disclaimer, the term of this patent is extended or adjusted under 35 U.S.C. 154(b) by 303 days.

(21) Appl. No.: 12/617,333

(22) Filed: Nov. 12, 2009

(65) Prior Publication Data
US 2011/0113031 A1  May 12, 2011

(51) Int. Cl.
*G06F 17/30* (2006.01)
*G06F 7/00* (2006.01)

(52) U.S. Cl.
USPC ............ 707/769; 707/693; 707/717; 707/756

(58) Field of Classification Search
None
See application file for complete search history.

(56) References Cited

U.S. PATENT DOCUMENTS

| | | | |
|---|---|---|---|
| 5,640,554 A * | 6/1997 | Take | 1/1 |
| 5,850,547 A * | 12/1998 | Waddington et al. | 718/102 |
| 6,289,334 B1 * | 9/2001 | Reiner et al. | 1/1 |
| 6,385,604 B1 * | 5/2002 | Bakalash et al. | 1/1 |
| 6,484,159 B1 * | 11/2002 | Mumick et al. | 1/1 |
| 6,581,205 B1 * | 6/2003 | Cochrane et al. | 717/140 |
| 6,850,947 B1 * | 2/2005 | Chung et al. | 707/600 |
| 6,983,291 B1 * | 1/2006 | Cochrane et al. | 707/625 |
| 7,110,999 B2 * | 9/2006 | Colby et al. | 707/802 |
| 7,634,492 B2 * | 12/2009 | Parker et al. | 1/1 |
| 2003/0093407 A1 * | 5/2003 | Cochrane et al. | 707/2 |
| 2003/0229625 A1 * | 12/2003 | Melchior et al. | 707/3 |
| 2005/0125325 A1 * | 6/2005 | Chai et al. | 705/35 |

OTHER PUBLICATIONS

Microsoft Excel; Source: http://en.wikipedia.org/w/index.php?oldid=373631396; downloaded Jul. 15, 2010.
Joseph Ruzzi, et al., "Oracle® Coherence Developer's Guide Release 3.5", Jun. 2009, pp. 1-498, http://download.oracle.com/docs/cd/E14526_01/coh.350/e14537.pdf.
Stephanie Mcreynolds, "Complex Event Processing in the Real World", An Oracle White Paper, Sep. 2007, pp. 1-13, http://www.oracle.com/technologies/soa/docs/oracle-complex-event-processing.pdf.
IBM Research, "Complex Event Processing (CEP)—Innovation Matters", pp. 1-4, http://domino.watson.ibm.com/comm/research.nsf/pages/r.datamgmt.innovation.cep.html, Nov. 12, 2009.
Stream Base Systems, Inc., Complex Event Processing—"What is Complex Event Processing?", pp. 1-3, http://www.streambase.com/print/complex-event-processing.htm, Nov. 12, 2009.
Stream Base Systems, Inc., Complex Event Processing (CEP) Glossary, p. 1, http://www.streambase.com/print/complex-event-processing-glossary.htm, Nov. 12, 2009.
Stream Base Systems, Inc., "FX Aggregation", pp. 1-2, http://www.streambase.com/print/fx-aggregation.htm, Nov. 12, 2009.

* cited by examiner

*Primary Examiner* — Jung Kim
*Assistant Examiner* — James J Wilcox
(74) *Attorney, Agent, or Firm* — Miles & Stockbride P.C.

(57) ABSTRACT

A computer-readable medium, computer-implemented method, and apparatus are provided. In one embodiment, one or more events are received, a new intermediate state of a data partition is created based on the event, and the new intermediate state is stored. The new intermediate state is reduced into a form suitable for aggregation, and an aggregate value is created by aggregating the new intermediate state with other intermediate states of other data partitions.

18 Claims, 7 Drawing Sheets

Case Study Data Set

| 01. Kangaroo, San Francisco, 10, Pending | 04. Wombat, Tokyo, 4, Packing | 07. Kangaroo, Tokyo, 15, Pending | 10. Koala, Paris, 5, Packing | 13. Wombat, Munich, 5, Shipped |
| --- | --- | --- | --- | --- |
| 02. Kangaroo, London, 5, Packing | 05. Platypus, New York, 2, Packing | 08. Wombat, San Francisco, 10, Shipped | 11. Possum, London, 2, Packing | 14. Kangaroo, Munich, 7, Pending |
| 03. Koala, Tokyo, 25, Shipped | 06. Possum, Paris, 12, Pending | 09. Emu, London, 15, Shipped | 12. Emu, Munich, 10, Packing | 15. Possum, Athens, 3, Packing |

Fig. 7

Case Study Data Set

Partition 1

| 01. Kangaroo, San Francisco, 10, Pending | 04. Wombat, Tokyo, 4, Packing | 07. Kangaroo, Tokyo, 15, Pending | 10. Koala, Paris, 5, Packing | 13. Wombat, Munich, 5, Shipped |
| --- | --- | --- | --- | --- |

Partition 2

| 02. Kangaroo, London, 5, Packing | 05. Platypus, New York, 2, Packing | 08. Wombat, San Francisco, 10, Shipped | 11. Possum, London, 2, Packing | 14. Kangaroo, Munich, 7, Pending |
| --- | --- | --- | --- | --- |

Partition 3

| 03. Koala, Tokyo, 25, Shipped | 06. Possum, Paris, 12, Pending | 09. Emu, London, 15, Shipped | 12. Emu, Munich, 10, Packing | 15. Possum, Athens, 3, Packing |
| --- | --- | --- | --- | --- |

Fig. 8

CONTINUOUS AGGREGATION ON A DATA GRID

FIELD

One embodiment is directed generally to a computer system, and in particular to a computer system that provides for data aggregation.

BACKGROUND

An aggregation function (also commonly known as a reduction function, reduce function, aggregator function, aggregation and aggregator), takes a collection of values of a specific type (e.g., type X) and produces a single value of specific type, possibly a different type (e.g., type Y). Aggregation functions are very common in mathematics, especially as functions that apply to sets. For example, a common aggregation function is a "count" function which produces a count of a number of values in a set. As an example, if a count function is passed the following set, {1,3,5,7}, the count function will return the value 4, because there are four values in the aforementioned set. As another example, if the count function is passed the following set, {Apple}, the count function will return the value 1, because there is one value in the aforementioned set. Finally, if the count function is passed the following set, { }, the count function will return the value 0, as there are no values in the aforementioned set.

While the above definition clearly states that the result of an aggregation is a single value, a resulting value may also be single value that contains many elements. For example, the result of an aggregation function may be a set, bag (i.e., a set which may contain duplicate values), map, function, or some other type of collection. As an example of such an aggregation function, the "odd" aggregation function produces a set containing "odd" values from a given set of values. For example, odd({1,2,3,4,5})={1,3,5}.

Aggregation functions may also be applied to bags, as opposed to sets. For example, the aggregation function, "distinct," produces a set of distinct values contained within a bag (e.g., distinct([1,2,2,3,4,5,5])={1,2,3,4,5}. Other useful aggregation functions on bags and sets include: "min" (determining the minimum values in a collection), "max" (determining the maximum value in a collection), and "avg" (determining the average value in a collection).

One of the most advanced aggregation functions is the "group by" aggregation function. Its purpose is to group values into maps (often called tables). For example, where a system contains a collection of worldwide orders and an end-user requires the number of orders for each destination country, the system can provide a result represented using a group by aggregation function. Such a result could be presented as:

| Destination | Count |
|---|---|
| France | 2 |
| Germany | 1 |
| United Kingdom | 4 |
| United States | 4 |

Other aggregation functions may also be applied. Many software designers design computer systems which provide for such aggregation functions.

SUMMARY

One embodiment is directed to a computer-readable medium having instructions stored thereon that, when executed by a processor, cause the processor to perform aggregation. The instructions can include receiving an event, creating a new intermediate state of a data partition based on the event, and storing the new intermediate state. The instructions can further include reducing the new intermediate state into a form suitable for aggregation, and creating an aggregate value by aggregating the new intermediate state with other intermediate states of other data partitions.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Two known methods for implementing algorithms to calculate aggregations are the Single-Threaded Method and Parallel Method. The Single-Threaded Approach is the simplest method for calculating a result of an aggregation. Using this method, each value in an input data set is passed through an aggregation function, in sequence, to produce a result. While relatively easy to implement, this method is often slow for large data sets because the time to calculate aggregation is directly proportional to the size of the data set. That is, given a data set of size S and a constant calculation time of C for each value in the data set, the time T to calculate an aggregation using this approach may be expressed as $T=S*C$.

In contrast, the Parallel Method calculates a result in parallel by calculating an aggregate result for each data partition ("partition") of a data set, and subsequently aggregating each individual result into an overall final result. A partition is defined as a logical division of a data set, where each partition contains a distinct subset of the data set, and where each partition is capable of being processed by a separate computer processing unit ("CPU"). By simultaneously calculating the aggregation of partitions of the data set, the result can be calculated more efficiently than the Single-Threaded Method, and, in most cases, directly in proportion to the number of partitions. In other words, given a data set of size S, a constant calculation time of C for each value in the data set, and P partitions, the time T to calculate the result using the Parallel Method may be expressed as $T=S*C/P+(P*C)$, assuming that each partition can be aggregated in parallel, and that the cost of combining the aggregated partitions is $P*C$.

According to an embodiment of the invention, a new computer-implemented method, computer-readable medium, and apparatus for aggregating data is provided. In the embodiment, an initial aggregate result is calculated for each partition of a set of partitions and an overall aggregate result is calculated which represents the aggregate of the partition aggregate results. However, each initial partition aggregate result is maintained. That way, any changes in the underlying data can trigger partial re-calculations of the partition aggregate results, and the overall aggregate result, rather than recalculating a new aggregate result for each partition of the data set. The re-calculation of the partition aggregate and aggregate result using the previous aggregation results based on changes in the underlying data is identified as "continuous aggregation." Changes in the underlying data are processed through an event-driven model. By using the event-driven model, continuous aggregation avoids the requirement of revisiting the underlying data set to recalculate an aggregate result as a consequence of a single change in the underlying data.

Figure 1:
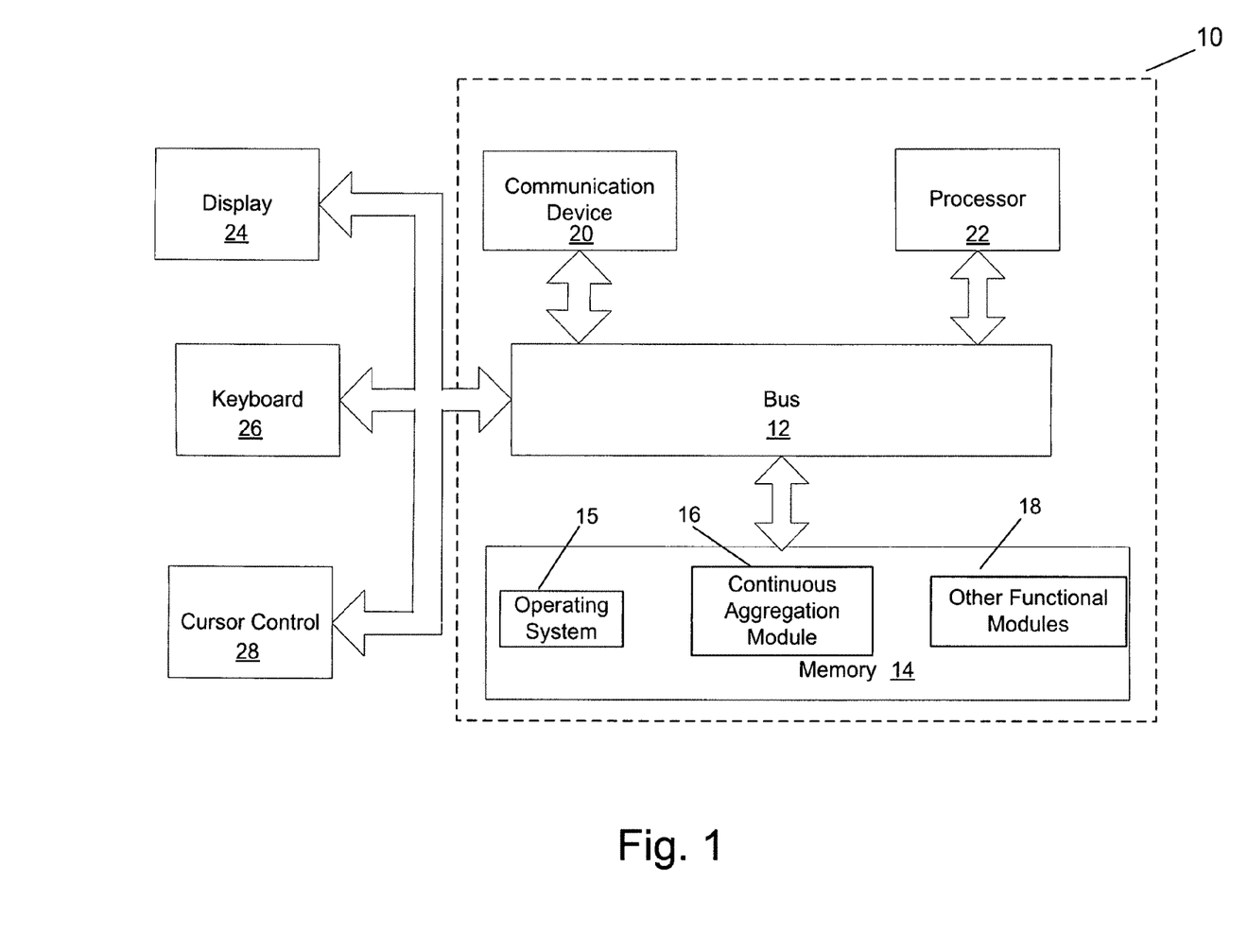
FIG. 1 illustrates a block diagram of an apparatus that may implement an embodiment of the present invention.

FIG. 1 illustrates a block diagram of an apparatus 10 that may implement one embodiment of the invention. Apparatus 10 includes a bus 12 or other communications mechanism for communicating information between components of apparatus 10. Apparatus 10 also includes a processor 22, operatively coupled to bus 12, for processing information and executing instructions or operations. Processor 22 may be any type of general or specific purpose processor. Apparatus 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Apparatus 10 further includes a communication device 20, such as a network interface card or other communications interface, to provide access to a network. As a result, a user may interface with apparatus 10 directly, or remotely through a network or any other method.

A computer-readable medium may be any available medium that can be accessed by processor 22. Computer-readable medium may include both volatile and nonvolatile media, removable and non-removable media, communication media, and storage media. Communication media may include computer readable instructions, data structures, program modules or other data in a modulated data signal such as a carrier wave or other transport mechanism, and may include any information delivery media. Storage media may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with apparatus 10.

According to one embodiment, memory 14 can store software modules that may provide functionality when executed by processor 22. The modules can include an operating system 15, a continuous aggregation module 16, as well as other functional modules 18. Operating system 15 can provide an operating system functionality for apparatus 10. Continuous aggregation module 16 provides for continuous aggregation, as will be described in more detail below. Apparatus 10 can also be part of a larger system. Thus, apparatus 10 can include one or more additional functional modules 18 to include the additional functionality. For example, functional modules 18 may include data management modules that are part of the "Coherence" product from Oracle Corporation.

As described above, continuous aggregation involves the partitioning of a data set into one or more partitions. There is no restriction or requirement on how partitioning is carried out. Thus, continuous aggregation may be utilized on any system capable of partitioning data, and the continuous aggregation method does not depend on any one particular type of data partitioning. Continuous aggregation further involves the parallel aggregation of data for each partition into an aggregate value for each partition. The aggregate result of a data set is calculated by aggregating each partition aggregate value into an overall aggregate value for the entire data set. The partition aggregate values are retained for subsequent calculations in what is identified as an intermediate state. Upon an event which indicates a change in the underlying state, the continuous aggregation method will update the relevant intermediate states (i.e., partition aggregate values) based on the changes to the underlying data in order to update the overall aggregate value of the data set.

Figure 2:
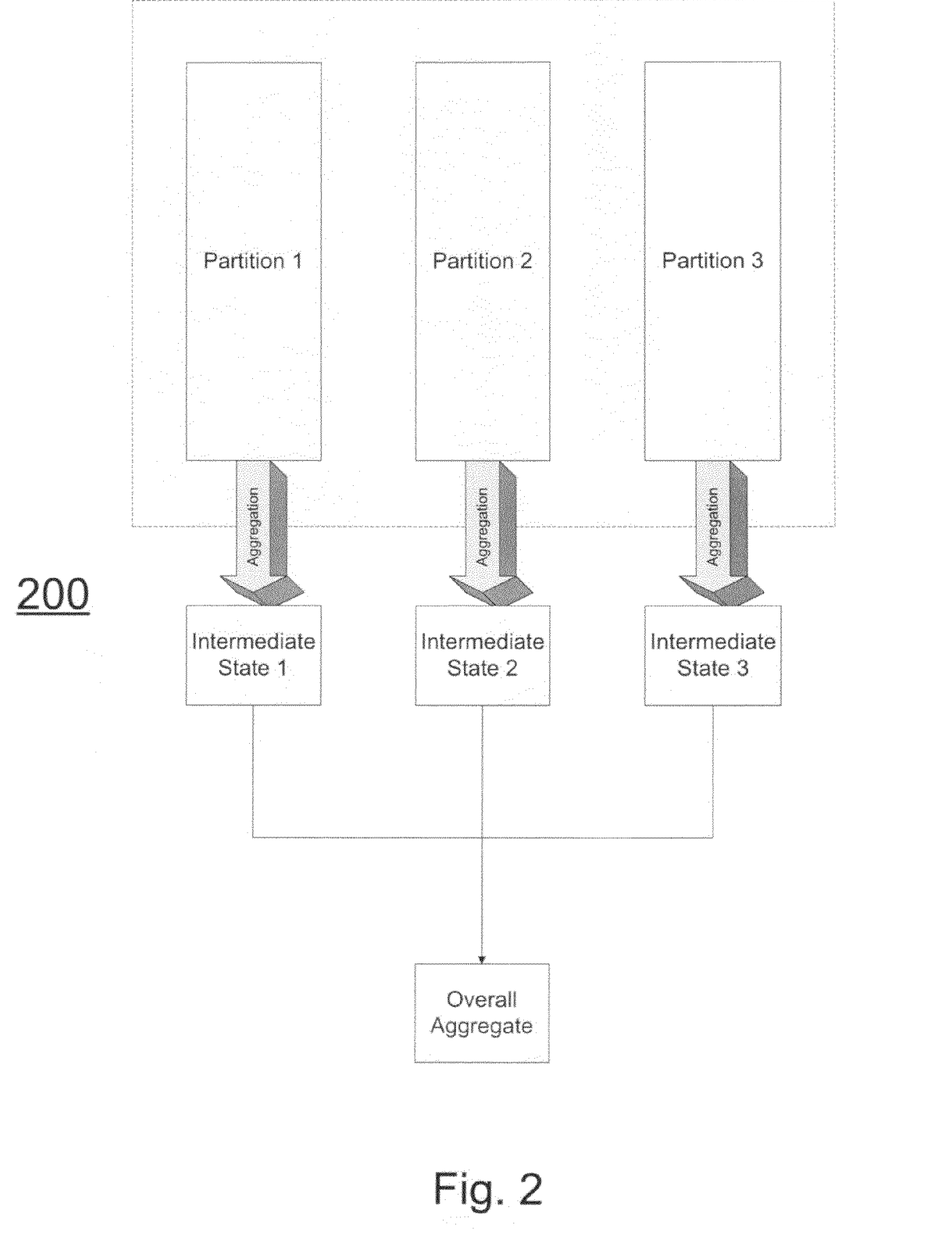
FIG. 2 illustrates a diagram of an implementation of continuous aggregation according to an embodiment of the invention.

FIG. 2 illustrates a diagram 200 of an implementation of an initial aggregation of a continuous aggregation according to an embodiment of the invention. In one embodiment, the functionality of the flow diagram 200 of FIG. 2, and the functionalities of flow diagrams 300 of FIG. 3, 400 of FIG. 4, 500 of FIG. 5, and 600 of FIG. 6 are each implemented by software stored in memory or other computer-readable or tangible media, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

FIG. 2 includes three data partitions, Partition 1, Partition 2, and Partition 3. Each partition is a partition as defined in a previous section of this specification, and includes a distinct subset of a data set. For each partition, an initial aggregation is calculated by feeding all of the existing values contained within each respective partition into a continuous aggregator which aggregates the existing values and produces an aggregate value. For each partition, this aggregate value is maintained in an "intermediate state." Thus, the intermediate state of each partition represents the aggregate value of the respective values contained within the respective partition. In the example illustrated in FIG. 2, Intermediate State 1 represents the aggregate value corresponding to Partition 1, Intermediate State 2 represents the aggregate value corresponding to Partition 2, and Intermediate State 3 represents the aggregate value corresponding to Partition 3. Once the intermediate state for each partition is generated, the continuous aggregator generates an overall aggregate value for the entire data set by aggregating the individual states of each partition. In the example illustrated in FIG. 2, the continuous aggregator aggregates intermediate state 1, intermediate state 2, and intermediate state 3 into an overall aggregate, which is represented by Overall Aggregate in FIG. 2. The overall aggregate represents the initial aggregate value for the entire data set.

According to the embodiment, the implementation of continuous aggregation uses an event dispatch mechanism (also known as an event dispatcher). The event dispatcher is capable of capturing all changes occurring on an underlying data set (such as inserts, updates, and deletes), and propagating the changes via one or more events to one or more event handlers that wish to be notified and process the one or more events. In a system that is utilizing data partitions, there may be one or more event dispatchers. In an embodiment of the invention, there is one event dispatcher per partition. In another embodiment, there is one event dispatcher per group of partitions being managed by a particular apparatus server. When a event occurs on an underlying data set, the event dispatcher sends the event to each of its registered event handlers which then, according to their specific requirements, perform some processing based on the event.

Figure 3:
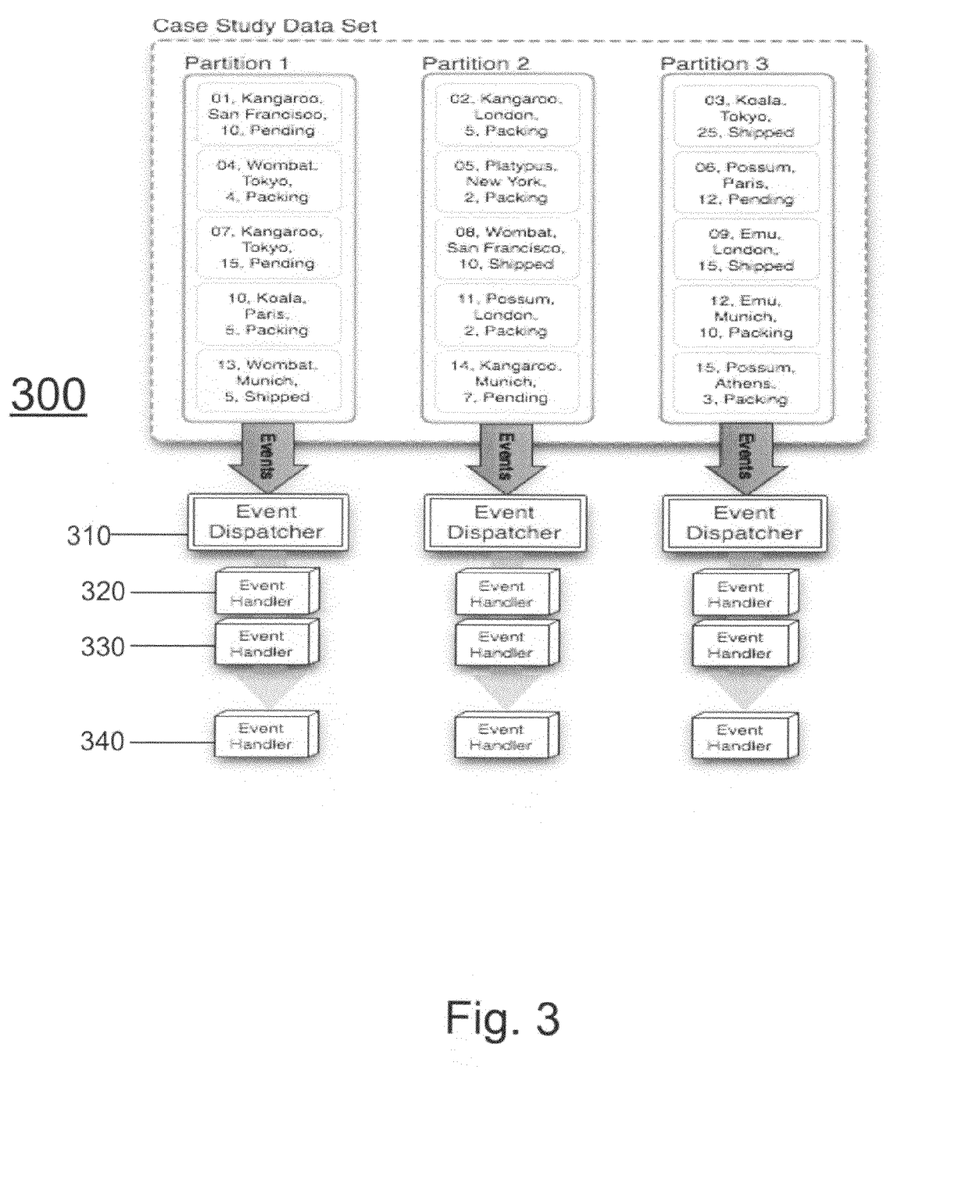
FIG. 3 illustrates a diagram which includes an event dispatcher and respective event handlers associated with a partition in accordance with an embodiment of the invention.

FIG. 3 illustrates a diagram 300 which includes an event dispatcher and respective event handlers associated with a partition in accordance with an embodiment of the invention. Diagram 300 includes three data partitions, Partition 1, Partition 2, and Partition 3. Each partition is a partition as previously disclosed. The data in partitions 1, 2, and 3 represent data relating to sample orders for shipping Australian animals to zoos in various countries. The data will be discussed in more detail below.

Diagram 300 also includes an event dispatcher which corresponds to each data partition. For example, diagram 300 includes event dispatcher 310 which corresponds to Partition 1. Event dispatcher 310 is capable of observing the data set included in Partition 1 and capturing any and all changes (such as insertions, updates, and deletions) to the underlying data set of Partition 1. Event dispatcher 310 is further capable of propagating the changes to the underlying data set to one or more event handlers, via one or more events. In order to receive an event from event dispatcher 310, an event handler registers with event dispatcher 310, and indicates that it wishes to be informed where there is a specific type of change to the underlying data set of partition 1. The event dispatchers that correspond to Partitions 2 and 3, respectively function in a similar manner.

Diagram 300 also includes three event handlers corresponding to each data partition (for a total of nine event handlers). While diagram 300 illustrates three event handlers for each data partition, one of ordinary skill in the art would readily understand that each data partition may include any number of event handlers. For example, diagram 300 includes event handlers 320, 330, and 340, which are the event handlers for Partition 1. When an event occurs on the underlying data set of Partition 1, event dispatcher 310 sends an event to each of its registered event handlers (i.e., event handlers 320, 330, and 340). Each registered event handler, according to its own specific requirements, performs some processing based on the event.

For example, event handler 320 may be registered to handle all insertions to the underlying data, event handler 330 may be registered to handle all updates to the underlying data, and event handler 340 may be registered to handle all updates to the underlying data. In the event of an insertion of a new data element into the underlying data set of Partition 1, event dispatcher 310 sends an event to event handler 320. Event handler 320 processes the event based in its own requirements. Similarly, in the event of an update of a data element of the underlying data set, event dispatcher 310 sends an event to event handler 330, which processes the event accordingly. Likewise, in the event of a deletion of a data element of the underlying data set, event dispatcher 310 sends an event to event handler 340, which processes the event accordingly.

According to an embodiment, a continuous aggregation event handler can also be coupled to an event dispatcher. The continuous aggregation event handler, along with associated continuous aggregation functions, is capable of calculating and maintaining an intermediate state for an associated partition based on the events delivered by an event dispatcher.

A continuous aggregation event handler provides the core mechanism by which continuous aggregations are performed. The continuous aggregation event handler registers with an event dispatcher, indicating that it wishes to be notified upon any change to the underlying data set of the partition. The continuous aggregation event handler is also capable of providing the following functionality:

a) establishing and maintaining an intermediate state for each partition for which it is receiving events;

b) receiving an event from an event dispatcher and propagating the event, along with a current intermediate state of the partition, to one or more associated continuous aggregation functions in order to update the intermediate state;

c) reducing the intermediate state into a form that is appropriate for an aggregation to produce a final result using the associated continuous aggregation functions; and d) providing the reduced intermediate state to the associated continuous aggregation functions so that a final aggregate result may be calculated.

Figure 4:
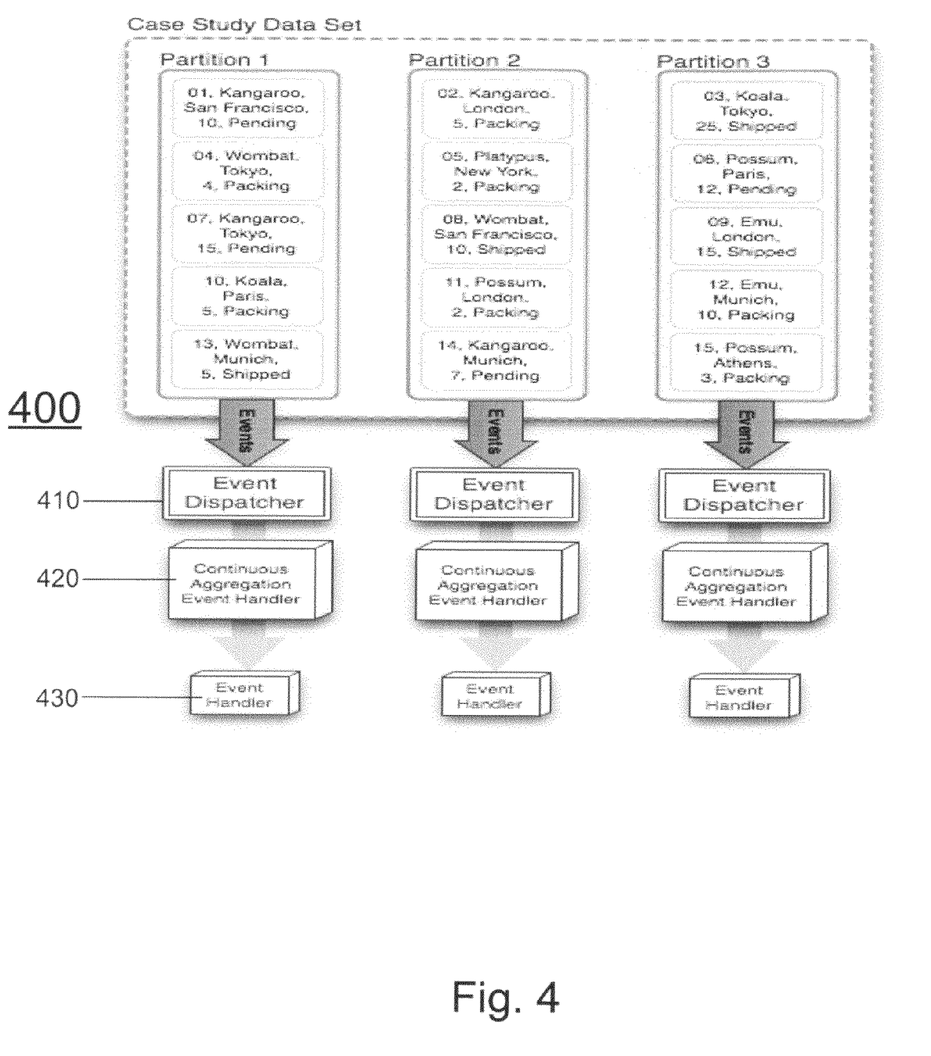
FIG. 4 illustrates a diagram which includes a continuous aggregation event handler in addition to an event dispatcher and respective event handlers associated with a partition in accordance with an embodiment of the invention.

FIG. 4 illustrates a diagram 400 which includes a continuous aggregation event handler in addition to an event dispatcher and respective event handlers associated with a partition in accordance with an embodiment of the invention. Diagram 400 is similar to diagram 300 of FIG. 3, except that each partition includes one continuous aggregation event handler and one event handler, rather than three event handlers. For example, Partition 1 includes event dispatcher 410, continuous aggregation event handler 420, and event handler 430.

Event dispatcher 410 is identical to event dispatcher 310 of FIG. 3, and event handler 430 is identical to event handlers 320, 330, and 340 of FIG. 3, with respect to functionality. Continuous aggregation event handler 420 is capable of establishing an intermediate state for Partition 1. Upon a change to the underlying data of Partition 1 (such as an insertion, update, or deletion), event dispatcher 410 sends a corresponding event to continuous aggregation event handler 420. Continuous aggregation event handler 420 propagates the event along with the intermediate state of Partition 1 to an associated continuous aggregation function and updates the intermediate state. Continuous aggregation event handler 420 is also capable of reducing the updated intermediate state into a form appropriate for a final aggregation, and providing the reduced intermediate state to the associated continuous aggregation function in order to calculate a final aggregate result for the entire data set (i.e., the data set represented by Partitions 1, 2, and 3).

Figure 5:
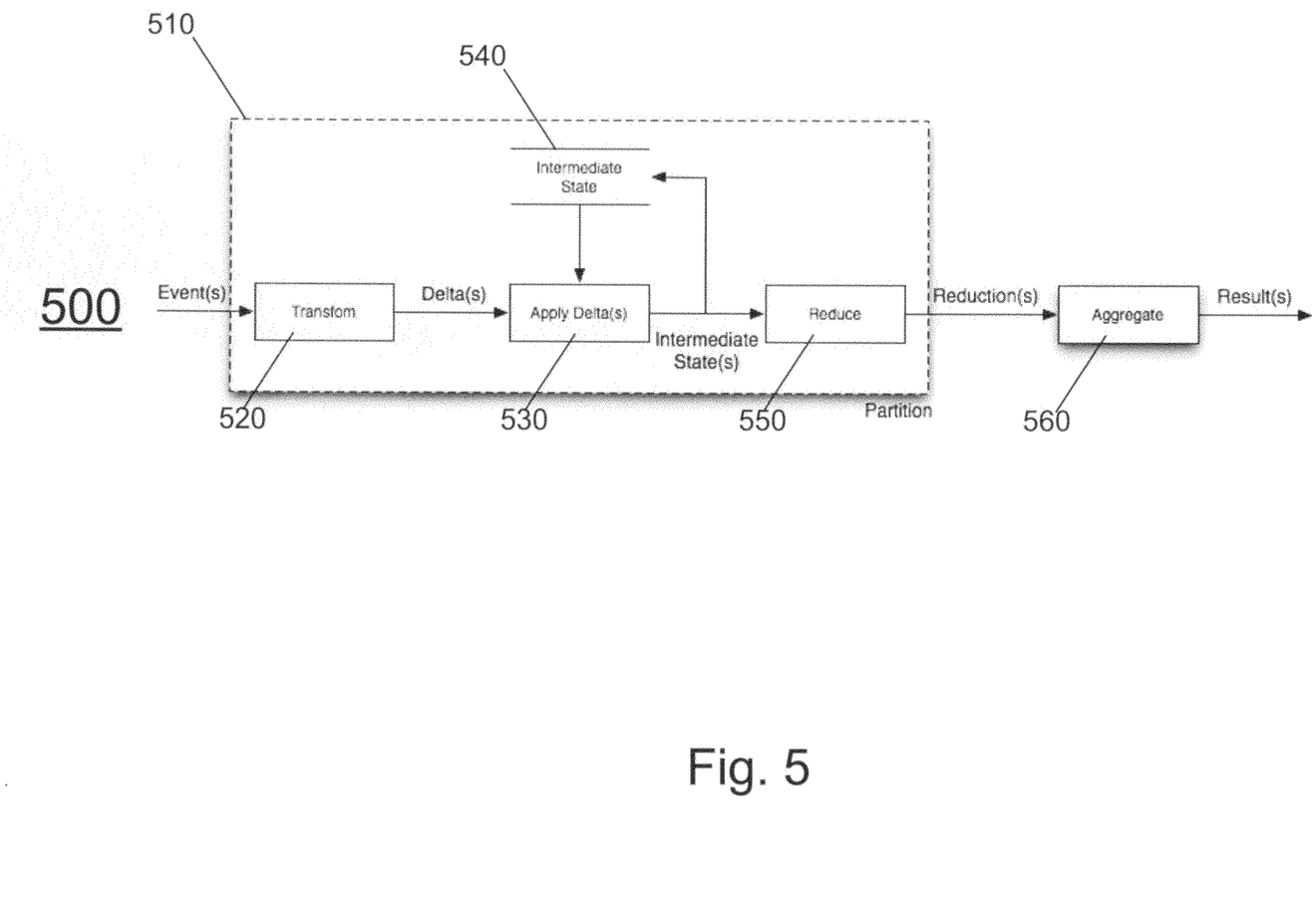
FIG. 5 illustrates a flow diagram of a continuous aggregation event handler performing continuous aggregation according to an embodiment of an invention.
Figure 6:
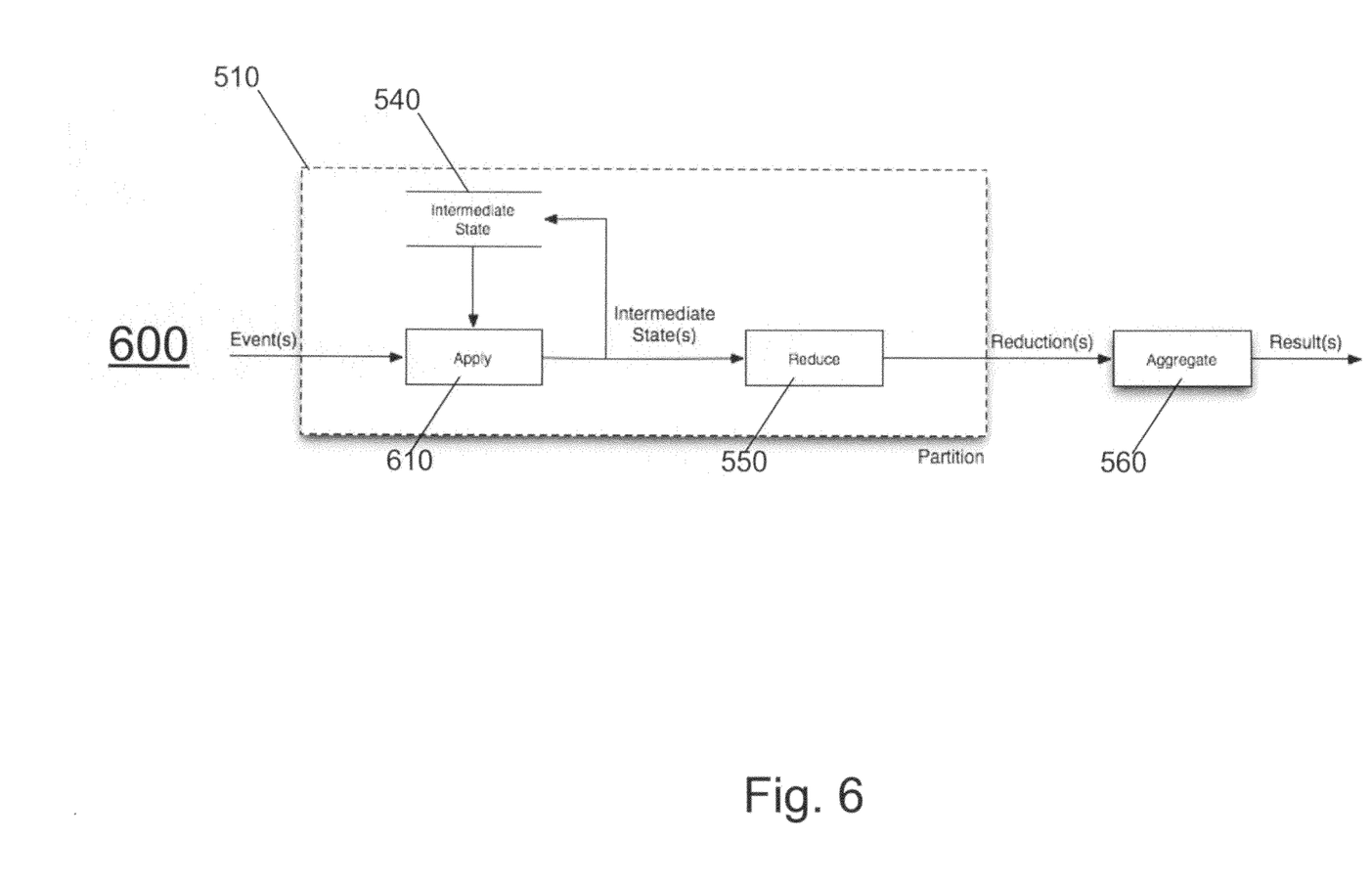
FIG. 6 illustrates a flow diagram of a continuous aggregation event handler performing continuous aggregation according to an alternative embodiment.

FIG. 5 illustrates a flow diagram 500 of a continuous aggregation event handler (not shown) performing continuous aggregation in accordance with an embodiment of the invention. Flow diagram includes a data partition 510. Data partition 510 is a partition as previously disclosed, such as Partition 1 of FIG. 4, and contains a portion of an overall data set. While the overall data set may include one or more partitions other than partition 510, other partitions of the overall data set are omitted from FIG. 5 for sake of clarity.

At 520, an event is received by the continuous aggregation event handler associated with partition 510. The event corresponds to a change to the portion of the data set contained within partition 510 such as an inserted value, an updated value, and a deleted value. The event is transformed into a delta value. The delta value represents a difference between the current intermediate state and the actual state of the partition.

At 530, the necessary calculations are applied to the delta value and the current intermediate state, in order to create a new intermediate state which reflects the delta value. The calculations depend on the type of continuous aggregation provided by the continuous aggregation event handler. For example, if the continuous aggregation is the "sum" function, then the calculations will be applied so that the new intermediate state reflects the sum of the current intermediate state and the delta value.

In circumstances where there is more than one event available to be processed, and thus, more than one delta value to be applied to the current intermediate state, the events may be processed together, one at a time, in order to create a plurality of delta values. Where there is more than one delta value to be applied to the current intermediate state, the delta values may be applied together, one at a time, so that the intermediate state may be accurate updated, and so that only one reduction and aggregation operation is needed. In an embodiment of the invention, a pipeline architecture may be adopted to enable the events (and thus, the delta values) to be applied together.

At 540, the new intermediate state (which reflects the one or more delta values) is stored. The new intermediate state is stored so that it can be used for future aggregations involving delta values. This way, the previous calculations used to generate the new intermediate state do not need to be re-performed.

At 550, the new intermediate state is reduced into a form so that it may be aggregated along with intermediate states of other partitions into an overall aggregate result. Although not shown in FIG. 5, similar calculations are performed for the other partitions of the overall data set, so that each partition produces a reduced intermediate state. The overall aggregate result represents the aggregate of the overall data set.

At 560 the reduced intermediate state of partition 510 and the reduced intermediate state of other partitions (not shown) are aggregated to produce an overall aggregate result. The aggregation that is performed depends on the type of continuous aggregation provided by the continuous aggregation event handler. For example, if the continuous aggregation is the "sum" function, then the reduced intermediate state of partition 510 and the reduced intermediate state of other partitions are added up to produced the overall aggregate result.

In an embodiment of the invention, initialization of the continuous aggregation event handler is achieved by setting the initial intermediate state to null. If the overall aggregate value is a map as opposed to a single value, the initial intermediate state may be set to an empty map. Subsequently, the calculations illustrated in flow diagram 500 can be performed for all of the existing entries of partition 510 to produce the initial intermediate state of partition 510. Afterwards, the calculations illustrated in flow diagram 500 can then be repeated for each change in the data, with the continuous aggregation applying the change to the previous intermediate state in order to calculate a new intermediate state, and thus, calculate a new overall aggregate value. Thus, according to the embodiment, the continuous aggregation is able to incrementally update an overall aggregate value for the entire data set without reprocessing the entire data.

FIG. 6 illustrates a flow diagram 600 of a continuous aggregation event handler (not shown) performing continuous aggregation in accordance with an alternative embodiment. In the alternative embodiment, an event received by the continuous aggregation event handler is not transformed into a delta value. Instead, at 610, the necessary calculations are applied directly to the current intermediate state in order to create a new intermediate state which reflects the change to the portion of the data set contained with partition 510 that corresponds to the received event. For example, the change may include an inserted value, an updated value, or a deleted value. Flow diagram 600 can produce an identical result as flow diagram 500, namely, an intermediate state which is updated based on received events. However, continuous aggregation according to flow diagram 600 may reduce the amount of CPU and memory required by eliminating the need to generate and apply delta values to an intermediate state.

An embodiment of the invention utilizing a framework developed in the Java® programming language for implementing a continuous aggregation function for a continuous aggregation event handler will now be described. However, one of ordinary skill in the art would readily understand that alternative embodiments may be implemented in other programming languages, such as C++, C#, Visual Basic, Python, Ruby, Perl 5, PHP, and ColdFusion, and be within the scope of the invention.

In the following discussion, it is assumed that only one continuous aggregation function per continuous event handler is provided. However, this restriction is only to simplify the discussion of the implementation of continuous aggregation. As one of ordinary skill in the art would readily understand, there is no limit as to the number of continuous aggregation functions that a single continuous aggregation event handler can manage.

According to the embodiment, an "ContinuousAggregator" interface is common to all continuous aggregators. The ContinuousAggregator interface provides a framework for reducing a given intermediate state for a data partition, and for aggregating a list of reduced values into an aggregate result.

Below is example pseudo-code for the ContinuousAggregator interface, according to an embodiment of the invention:

```
interface ContinuousAggregator<X, Y, Z> {
Where X is the type of the Intermediate State (for a partition),
      Y is the type of the reduced Intermediate State (for a partition),
      Z is the type of the aggregation.
public Y reduce(X ips);
      Given the Intermediate State (ips) (for a partition), reduce it so
      that is may be aggregated into a result.
public Z aggregate(Y... reductions);
      Aggregates a list of reduced values into the result of type Z.
}
```

The ContinuousAggregator allows the implementation of the reduce( ) and aggregate( ) functions to be defined by continuous aggregator classes that implement the ContinuousAggregator interface. The implementation of the reduce( ) and aggregate( ) functions may depend on the type of aggregation associated with the class.

Another factor that will determine the implementation of the ContinuousAggregator interface is the type of aggregate result. A continuous value aggregator is an aggregation function that produces a single value. A continuous set aggregator is an aggregation function that produces a set of values. A continuous map aggregator is an aggregation function that produces a map (i.e., table) of values.

Depending on whether the type of aggregation result is a single value, a map, or a set, one of the following interfaces may be implemented in place of the ContinuousAggregator interface:

```
interface ContinuousValueAggregator<X, Y, Z> extends
ContinuousAggregator<X, Y, Z> {
    public X apply(EntryEvent event, X ips);
        Given an Event on an entry and the Intermediate State (for a partition),
        apply the necessary calculations to the Intermediate State produce a new
        Intermediate State that will correctly maintain the aggregation based on
        the Event.
}
interface ContinuousMapAggregator<X, Y, Z> extends ContinuousAggregator<X,
Y, Z> {
    public void apply(EntryEvent event, Map<?, X> ips);
        Given an Event on an entry and the Map-based Intermediate State (ips)
        (for a partition), apply the necessary mutations to the Intermediate State
        to maintain the aggregation based on the Event.
}
```

For value aggregators, the ContinuousValueAggregator interface may be implemented. For map aggregators, the ContinuousMapAggregator interface may be implemented. For set aggregators, either the ContinuousValueAggregator interface or the ContinuousMapAggregator interface may be implemented.

According to the embodiment, because the ContinuousValueAggregator interface and the ContinuousMapAggregator each extend the ContinuousValueAggregator interface, either interface can be implemented in place of the ContinuousValueAggregator interface. Thus, it will not be necessary to implement both the ContinuousValueAggregator interface and either the ContinuousValueAggregator interface or the ContinuousMapAggregator interface.

As discussed above, the implementation details of the ContinuousAggregator interface are left to classes which implement the ContinuousAggregator interface, depending on the specific type of aggregation function. An example class of a common aggregator implemented as a continuous aggregation is a ContinuousSumAggregator class, which implements a sum aggregation function, according to an embodiment of the invention. However, one of ordinary skill in the art would readily understand that this example is merely a non-limiting example embodiment of the invention, and that additional embodiments of the invention may include other implementations of the ContinuousAggregator interface which use an aggregate function to evaluate one or more values and produce either an aggregate single value, an aggregate set of values, or an aggregate map of values.

Below is example pseudo-code for the ContinuousSumAggregator class, according to an embodiment of the invention:

```
public class ContinuousSumAggregator<Long, Long, Long>
implements
ContinuousValueAggregator<Long, Long, Long> {
    public Long apply(EntryEvent entryEvent, Long ips) {
        Long newValue;
        if (entryEvent instanceof EntryInsertedEvent) {
            newValue = value == null ? entryEvent.value
                : ips + entryEvent.value;
        } else if (entryEvent instanceof EntryUpdatedEvent) {
            newValue = value == null ? -entryEvent.originalValue +
            entryEvent.value
                : ips - entryEvent.originalValue +
                entryEvent.value
        } else if (entryEvent instanceof EntryRemovedEvent) {
            newValue = value == null ? null
                : ips - entryEvent.value
        } else {
            newValue = value;
        }
        if (newValue != null && newValue <= 0)
```

-continued

```
            return null;
        else
            return newValue;
    }
    public Long reduce(Long x) {
        return x;
    }
    public Long aggregate(Iterator<Long> values) {
        long result = 0;
        boolean hasResult = false;
        for (;values.hasNext();) {
            Long value = values.next();
            if (value != null) {
                hasResult = true;
                result += value;
            }
        }
        return hasResult ? result : null;
    }
}
```

As can be seen from the above pseudo code, the ContinuousSumAggregator class implements the ContinuousValueAggregator interface. This is because the sum aggregation function produces a single value for an aggregate value: the arithmetic sum of all the values of the data set. The ContinuousSumAggregator further provides the implementation of the apply( ) function of the ContinuousValueAggregator interface, and provides the implementation of the reduce( ) and aggregate( ) functions of the ContinuousAggregator interface (which are inherited by the ContinuousValueAggregator interface).

The apply( ) function receives an event of type EntryEvent, and an intermediate state of a partition. If the event is of type EntryInsertedEvent (i.e., if the event indicates that a new value has been added to the partition data set), the apply( ) function adds the new value to the intermediate state. If the event is of type EntryUpdatedEvent (i.e., if the event indicates that an old value of a partition data set is to be updated with a new value), the apply( ) function subtracts the old value from the intermediate state and adds the new value to the intermediate state. If the event is of type EntryRemovedEntry (i.e., if the event indicates that an old value of the partition data set is to be removed), the apply( ) function subtracts the old value from the intermediate state. The apply( ) function then returns the updated intermediate state.

The reduce( ) function simply returns the value x that is passed into the function. This is because the apply( ) function for the "sum" aggregation function places the value x in suitable form for final aggregation. However, one of ordinary skill in the art would readily understand that for other types of aggregations, the reduce( ) function will involve more complex processing. For example, in the "average" aggregation function, the reduce( ) function can receive a sum and a count of the values of the partition and return an average value of the partition, along with a count value.

The aggregate( ) function receives a list of values, with each value representing an intermediate state of a partition. The aggregate( ) function subsequently calculates the sum of the list of values, and thus, returns the overall aggregate sum of the data.

Through the use of the apply( ) reduce( ) and aggregate( ) functions, the ContinuousSumAggregator class is able to respond to a received event related to a change in the underlying data, update each intermediate state of the affected partition(s), and update the overall aggregate sum of the data.

The following example will be used to further describe the implementation of a continuous aggregation function in accordance with one embodiment. A company in Australia has the responsibility for sourcing and shipping Australian animals to zoos around the world. As part of this responsibility, the company needs to provide certain real-time reports to government agencies as to the status of orders and corresponding shipments. To provide these real-time reports, the company uses continuous aggregation.

The following table outlines the set of sample orders together with their associated statuses:

| Order Number | Animal   | Destination    | Number to Ship | Status  |
|--------------|----------|----------------|----------------|---------|
| 01           | Kangaroo | San Francisco  | 10             | Pending |
| 02           | Kangaroo | London         | 5              | Packing |
| 03           | Koala    | Tokyo          | 25             | Shipped |
| 04           | Wombat   | Tokyo          | 4              | Packing |
| 05           | Platypus | New York       | 2              | Shipped |
| 06           | Possum   | Paris          | 12             | Pending |
| 07           | Kangaroo | Tokyo          | 15             | Pending |
| 08           | Wombat   | San Francisco  | 10             | Shipped |
| 09           | Emu      | London         | 15             | Shipped |
| 10           | Koala    | Paris          | 5              | Packing |
| 11           | Possum   | London         | 2              | Packing |
| 12           | Emu      | Munich         | 10             | Packing |
| 13           | Wombat   | Munich         | 5              | Shipped |
| 14           | Kangaroo | Munich         | 7              | Pending |
| 15           | Possum   | Athens         | 3              | Packing |

Figure 7:
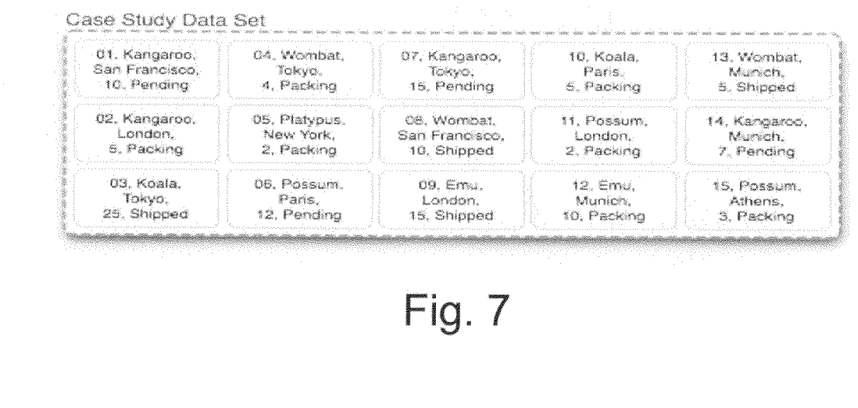
FIG. 7 illustrates a data set for a case study implementing continuous aggregation according to an embodiment of an invention.

FIG. 7 illustrates an alternative representation of a data set for the example implementing continuous aggregation according to an embodiment of an invention. As can be seen from FIG. 7, the data set includes 15 data elements, which each data element including the order number (e.g., "01"), animal (e.g., "Kangaroo"), destination (e.g., "San Francisco"), number to ship (e.g., "10"), and status of the particular order (e.g., "Pending").

As continuous aggregation is performed on partitions of data, the sample data is partitioned into three partitions, Partition 1, Partition 2, and Partition 3. As one of ordinary skill in the art would readily understand, the method used to partition the sample data is not relevant to the implementation of continuous aggregation. Additionally, the number of partitions and the content of the partitions have been chosen arbitrarily, and one of ordinary skill in the art would readily understand that there may be any number of partitions, and each partition may include any number of data elements.

The contents of Partition 1 are as follows:

| Order Number | Animal   | Destination    | Number to Ship | Status  |
|--------------|----------|----------------|----------------|---------|
| 01           | Kangaroo | San Francisco  | 10             | Pending |
| 04           | Wombat   | Tokyo          | 4              | Packing |
| 07           | Kangaroo | Tokyo          | 15             | Pending |
| 10           | Koala    | Paris          | 5              | Packing |
| 13           | Wombat   | Munich         | 5              | Shipped |

The contents of Partition 2 are as follows:

| Order Number | Animal   | Destination    | Number to Ship | Status  |
|--------------|----------|----------------|----------------|---------|
| 02           | Kangaroo | London         | 5              | Packing |
| 05           | Platypus | New York       | 2              | Shipped |
| 08           | Wombat   | San Francisco  | 10             | Shipped |
| 11           | Possum   | London         | 2              | Packing |
| 14           | Kangaroo | Munich         | 7              | Pending |

The contents of Partition 3 are as follows:

| Order Number | Animal | Destination | Number to Ship | Status  |
|--------------|--------|-------------|----------------|---------|
| 03           | Koala  | Tokyo       | 25             | Shipped |
| 06           | Possum | Paris       | 12             | Pending |
| 09           | Emu    | London      | 15             | Shipped |
| 12           | Emu    | Munich      | 10             | Packing |
| 15           | Possum | Athens      | 3              | Packing |

Figure 8:
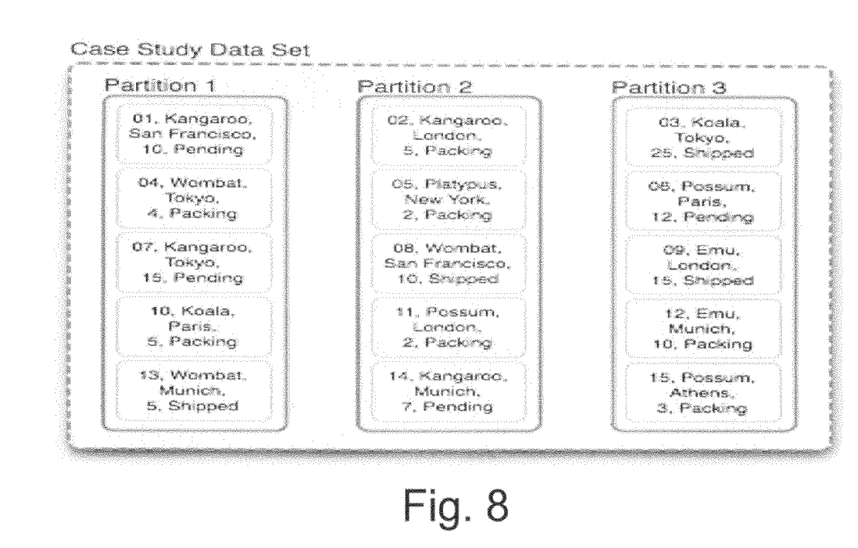
FIG. 8 illustrates a data set separated into partitions for a case study implementing continuous aggregation according to an embodiment of the invention.

FIG. 8 illustrates an alternative representation of data set separated into partitions for implementing continuous aggregation according to an embodiment of the invention. As can be seen from FIG. 8, the data is separated into three partitions, Partition 1, Partition 2, and Partition 3. Partition 1 includes order numbers 01, 04, 07, 10, and 13. Partition 2 includes order numbers 02, 05, 08, 11, and 14. Partition 3 includes order numbers 03, 06, 09, 12, and 15.

The following are examples of reports (based on continuous aggregation functions) that the company may generate.

1. Total Number of Orders ("Count" Aggregation):

| Result |
|--------|
| 15     |

2. Types of Animals ("Distinct" Aggregation):

| Result   |
|----------|
| Kangaroo |
| Koala    |
| Wombat   |
| Platypus |
| Possum   |
| Emu      |

3. Largest Order ("Maximum" Aggregation):

| Result |
|--------|
| 25     |

4. Total Number of Animals Pending, Packing, or Shipped ("Sum" Aggregation):

| Result |
|---|
| 130 |

5. Total Number of Orders, by Status ("GroupBy" Aggregation and "Sum" Aggregation):

| Status | Result |
|---|---|
| Pending | 4 |
| Packing | 6 |
| Shipped | 5 |

6. Total Number of Animals, by Status ("GroupBy" Aggregation and "Count" Aggregation):

| Status | Result |
|---|---|
| Pending | 44 |
| Packing | 29 |
| Shipped | 57 |

7. Total Number of Animals Pending, Packing, or Shipped, by Destination ("GroupBy" Aggregation and "Sum" Aggregation):

| Destination | Result |
|---|---|
| San Francisco | 20 |
| London | 22 |
| Tokyo | 44 |
| New York | 2 |
| Paris | 17 |
| Munich | 22 |
| Athens | 3 |

Thus, an embodiment of the present invention provides for the continuous aggregation of data values for one or more partitions by maintaining an intermediate state for each partition which represents the aggregate value for each partition, and by maintaining an overall aggregate value which represents the aggregate of the one or more intermediate states. Upon a change to the data in the one or more partitions, the corresponding intermediate state, and the overall aggregate value is updated based on the change in the underlying data.

Furthermore, an embodiment of the present invention provides many advantages not realized by previous aggregation methods. For example, because continuous aggregation only requires partial re-calculations to aggregate results upon data changes, and avoids re-calculating the aggregate for the complete data set, continuous aggregation provides significant performance and scalability improvements over previous aggregation methods. Through the use of an event-driven model, continuous aggregation avoids the requirement of re-processing the entire underlying data set to recalculate the aggregate result as a consequence of a single change in the underlying data.

The efficiencies of the continuous aggregation method are demonstrated by the following analysis. Given a data set of size S, a constant calculation time of C for each value in the data set, if D changes are made to the underlying data, time to calculate the aggregations for each of the changes independently (i.e., T) would be:

(a) Single-Threaded Method $T=(S*C)*D$ (as the entire aggregation must be re-calculated $D$ times)

(b) Parallel Method $T=(S*C/P+(P*C))*D$ (as the entire aggregation must be re-calculated $D$ times)

(c) Continuous Aggregation Method $T=(S*C/P+(P*C))+(D*C)$ (the same cost as the Parallel Method to establish the initial aggregation, plus $D$ changes to that result, which each change costing $C$)

In none of these cases it is assumed that the changes occur in parallel, across the partitions. Should the changes occur in parallel, the results of the continuous aggregation would be P times better.

As an example, assuming S equals 100,000 data values to aggregate, C equals 0.1 seconds, P equals 257 partitions, and D equals 1000 changes to the underlying data, the following figures can be calculated, using the above formulas:

| Aggregation Approach | Total Aggregation Time (seconds) | Total Aggregation Time (days, hours, minutes, seconds) |
|---|---|---|
| Single Threaded | 10000000 seconds | 115 days, 17 hours, 46 minutes, 40 seconds |
| Parallel | 64610.51 seconds | 17 hours, 56 minutes, 51 seconds |
| Continuous | 164.61 seconds | 2 minutes, 44 seconds |

Thus, the efficiencies of the continuous aggregation method are clear.

The above calculations assume a system which makes D changes to data sequentially and re-calculates aggregations after each change. However, the advantages of continuous aggregation still hold even when two aggregation calculations are needed: the initial aggregation calculation and the recalculation of the aggregation after D changes have been made.

For the Single Threaded method, the time to calculate the aggregation would be:

$T=(S*C)*2$

For the Parallel method, the time to calculate the aggregation would be:

$T=(S*C/P+(P*C))*2$

For the Continuous Aggregation method, the time to calculate the aggregation would be:

$T=(S*C/P+(P*C))+(2*C)$

As an example, assuming S equals 100,000 data values to aggregate, C equals 0.1 seconds, P equals 257 partitions, and D equals 1000 changes to the underlying data, the following figures can be calculated using the above formulas:

| Aggregation Approach | Total Aggregation Time (seconds) |
|---|---|
| Single Threaded | 20000.00 |
| Parallel | 129.22 |
| Continuous | 64.63 |

Thus, even when only two aggregations are performed, the efficiencies of the continuous aggregation method are clear.

In situations where U users are requesting the same aggregation to be calculated, the Single Threaded and Parallel methods become dramatically worse, while the Continuous Aggregation method remains constant.

For the Single Threaded method, the time to calculate the aggregation for all U users would be:

$$T=((S*C)*D)*U$$

For the Parallel method, the time to calculate the aggregation for all U users would be:

$$T=((S*C/P+(P*C))*D)*U$$

Finally, for the Continuous Aggregation method, the time to calculate the aggregation for all U users would be:

$$T=(S*C/P+(P*C))+(D*C)$$

The reason that the Continuous Aggregation method remains constant, while the other two methods dramatically worsen, is that, because the aggregate result is constantly being maintained, there is no additional cost for each user to calculate the aggregate result. Thus, embodiments of the present invention which utilize continuous aggregation provides many significant advantages.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to perform aggregation, the aggregation comprising:

calculating an initial aggregation of one or more values for each data partition of a system that comprises a plurality of data partitions, wherein each data partition comprises a distinct portion of a data set, wherein each data partition is processed by a separate computer processing unit, wherein a current intermediate state is maintained for each data partition, and wherein each current intermediate state represents the initial aggregation of one or more values of the corresponding data partition;

calculating an overall aggregate value for the data set by aggregating the plurality of current intermediate states for the plurality of data partitions;

receiving, by a continuous aggregation event handler, an event, wherein the event represents a change to at least one value of a data partition;

transforming the event into a delta value, wherein the delta value represents a difference between the current intermediate state of the data partition and an actual state of the data partition that comprises the change to the at least one value of the data partition;

setting a new intermediate state of the data partition to an aggregate of the current intermediate state of the data partition and the delta value;

updating the current intermediate state with the new intermediate state;

storing the new intermediate state;

reducing, by the continuous aggregation event hander, the new intermediate state into a form suitable for aggregation;

updating at least one other intermediate state of at least one other data partition by performing, in parallel, the receiving, transforming, setting, updating, storing, and reducing, for at least one of the other data partitions; and updating the overall aggregate value for the data set by aggregating the new intermediate state with the other intermediate states of the other data partitions.

2. The computer-readable medium of claim 1, wherein the aggregate value comprises a single value.

3. The computer-readable medium of claim 1, wherein the aggregate value comprises a set of single values.

4. The computer-readable medium of claim 1, wherein the aggregate value comprises a map of single values.

5. The computer-readable medium of claim 1, wherein when there is more than one event, the aggregation further comprises repeating the receiving and transforming so that a plurality of events is transformed into a single delta value before performing the rest of the aggregation.

6. The computer-readable medium of claim 1, the instructions further comprising initializing an initial intermediate state of a partition to one of a null value or an empty map.

7. A computer-implemented method for performing aggregation, the computer-implemented method comprising:

calculating an initial aggregation of one or more values for each data partition of a system that comprises a plurality of data partitions, wherein each data partition comprises a distinct portion of a data set, wherein each data partition is processed by a separate computer processing unit, wherein a current intermediate state is maintained for each data partition, and wherein each current intermediate state represents the initial aggregation of one or more values of the corresponding data partition;

calculating an overall aggregate value for the data set by aggregating the plurality of current intermediate states for the plurality of data partitions;

receiving, by a continuous aggregation event handler, an event, wherein the event represents a change to at least one value of a data partition;

transforming the event into a delta value, wherein the delta value represents a difference between the current intermediate state of the data partition and an actual state of the data partition that comprises the change to the at least one value of the data partition;

setting a new intermediate state of the data partition to an aggregate of the current intermediate state of the data partition and the delta value;

updating the current intermediate state with the new intermediate state;

storing the new intermediate state;

reducing, by the continuous aggregation event hander, the new intermediate state into a form suitable for aggregation;

updating at least one other intermediate state of at least one other data partition by performing, in parallel, the receiving, transforming, setting, storing, updating, and reducing, for at least one of the other data partitions; and updating the overall aggregate value for the data set by aggregating the new intermediate state with the other intermediate states of the other data partitions.

8. The computer-implemented method of claim 7, wherein the aggregate value comprises a single value.

9. The computer-implemented method of claim 7, wherein the aggregate value comprises a set of single values.

10. The computer-implemented method of claim 7, wherein the aggregate value comprises a map of single values.

11. The computer-implemented method of claim 7, wherein when there is more than one event, the method further comprises repeating the receiving and transforming so that a plurality of events is transformed into a single delta value before performing the rest of the method.

12. The computer-implemented method of claim 7, the method further comprising initializing an initial intermediate state of a partition to one of a null value or an empty map.

13. An apparatus comprising:

a computer processor configured to cause the apparatus to, calculate an initial aggregation of one or more values for each data partition of a system that comprises a plurality of data partitions, wherein each data partition comprises a distinct portion of a data set, wherein each data partition is processed by a separate computer processing unit, wherein a current intermediate state is maintained for each data partition, and wherein each current intermediate state represents the initial aggregation of one or more values of the corresponding data partition;

calculate an overall aggregate value for the data set by aggregating the plurality of current intermediate states for the plurality of data partitions;

receive, by a continuous aggregation event handler, an event, wherein the event represents a change to at least one value of a data partition;

transform the event into a delta value, wherein the delta value represents a difference between the current intermediate state of the data partition and an actual state of the data partition that comprises the change to the at least one value of the data partition;

set a new intermediate state of the data partition to an aggregate of the current intermediate state of the data partition and the delta value;

update the current intermediate state with the new intermediate state;

store the new intermediate state;

reduce, at the continuous aggregation event hander, the new intermediate state into a form suitable for aggregation;

update at least one other intermediate state of at least one other data partition by performing, in parallel, the receiving, transforming, setting, updating, storing, and reducing, for at least one of the other data partitions; and update the overall aggregate value for the data set by aggregating the new intermediate state with other intermediate states of the other data partitions.

14. The apparatus of claim 13, wherein the aggregate value comprises a single value.

15. The apparatus of claim 13, wherein the aggregate value comprises a set of single values.

16. The apparatus of claim 13, wherein the aggregate value comprises a map of single values.

17. The apparatus of claim 13, wherein when there is more than one event, the apparatus is further configured to repeat the receiving and transforming so that a plurality of events is transformed into a single delta value.

18. The apparatus of claim 13, the processor further configured to cause the apparatus to initialize an initial intermediate state of a partition to one of a null value or an empty map.

* * * * *

UNITED STATES PATENT AND TRADEMARK OFFICE
CERTIFICATE OF CORRECTION

PATENT NO.         : 8,566,341 B2                                                Page 1 of 1
APPLICATION NO.    : 12/617333
DATED              : October 22, 2013
INVENTOR(S)        : Oliver et al.

It is certified that error appears in the above-identified patent and that said Letters Patent is hereby corrected as shown below:

In the Specification

Column 7, line 45, delete "produced" and insert -- produce --, therefor.

Column 11, line 11, delete "apply() reduce()" and insert -- apply(), reduce(), --, therefor.

Signed and Sealed this
Third Day of June, 2014

Michelle K. Lee
*Deputy Director of the United States Patent and Trademark Office*